Figures 1, 2:
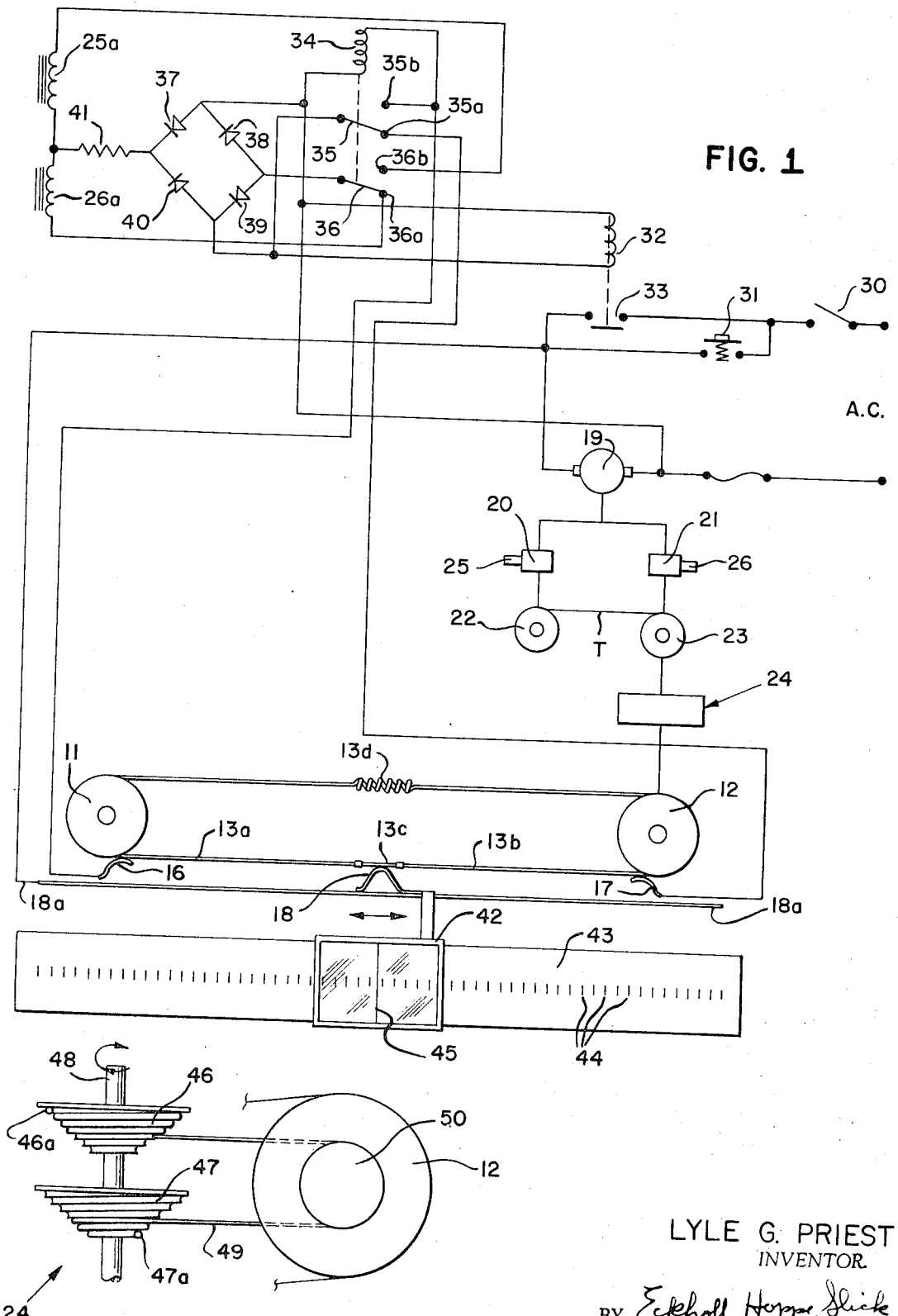

United States Patent [19]
Priest

[11] 3,710,221
[45] Jan. 9, 1973

[54] APPARATUS FOR POSITIONING FILM OR TAPE WOUND ON REELS

[75] Inventor: Lyle Gilbert Priest, Palo Alto, Calif.

[73] Assignee: Information Design, Inc.

[22] Filed: June 25, 1971

[21] Appl. No.: 156,660

[52] U.S. Cl. ................................. 318/467, 318/673
[51] Int. Cl. ............................................. G05b 1/06
[58] Field of Search ..................... 318/467, 673, 39

[56] References Cited

UNITED STATES PATENTS 3,614,574  10/1971  Hodges ................................ 318/467
3,324,685  6/1967  Schmidt et al. ....................... 318/39
3,069,611  12/1962  Waarle et al. ....................... 318/467

Primary Examiner—Benjamin Dobeck
Attorney—Carl Hoppe et al.

[57] ABSTRACT

A switching mechanism including a sliding contact and a pair of movable contacts which control a motor used to drive a film or tape between two reels. A mechanical feedback positions the movable contacts in relationship to linear displacement of the film or tape in accordance with the set position of the sliding contact. An analog computer mechanism comprising a pair of spiral pulleys linearizes the feedback relative to film or tape displacement.

7 Claims, 2 Drawing Figures

PATENTED JAN 9 1973

3,710,221

LYLE G. PRIEST
INVENTOR.

BY Eckhoff, Hoppe, Slick
Mitchell and Anderson

ATTORNEYS

APPARATUS FOR POSITIONING FILM OR TAPE WOUND ON REELS

This invention relates generally to a mechanism for positioning film or tape wound on reels. It has particular application to machines for viewing microfilm by selecting a particular picture or frame on a filmstrip and positioning that particular picture in front of a lens.

In brief, this invention teaches a novel switching mechanism for operating a motor control circuit including a pair of clutches that may be selectively engaged to drive a pair of reels and accurately position a filmstrip for viewing a selected picture or frame. The switching mechanism comprises a sliding contact and a pair of movable contacts which are positioned by a mechanical feedback mechanism. The mechanical feedback positions the movable contacts in relationship to displacement of the film or tape as it is wound or unwound from a take-up reel. A pair of spiral pulleys mechanically linked to the take-up reel serve as an analog computer to linearize the relationship of mechanical feedback with respect to film or tape displacement.

One object of the present invention is to provide a novel switching mechanism for accurately positioning a filmstrip for viewing a selected picture or frame.

Another object is to provide a switching mechanism of the kind described and more particularly comprising a sliding contact and a pair of movable contacts and a mechanical feedback for positioning the movable contacts in relationship to linear displacement of the film or tape and in accordance with the set position of the sliding contact.

A still further object of this invention is to provide apparatus of the kind described including an inexpensive analog computer mechanism for linearizing the movement of the movable contacts in relationship to linear displacement of the film or tape.

Other objects of this invention will become apparent in view of the following detailed description.

In the drawings forming a part of this application and in which like parts are identified by like reference numerals, FIG. 1 is a diagrammatic view of a preferred form of apparatus for practicing this invention including a schematic diagram of a motor control circuit; and FIG. 2 is a plan view of a mechanical analog computer device used by the invention for linearizing mechanical feedback.

Referring to FIG. 1, a switching mechanism 10 comprises a pair of pulleys 11 and 12 that are interconnected by a belt 13 formed of two electrically conductive portions 13a and 13b, a nonconductive section 13c and a nonconductive tensioning spring 13d. Conductive sections 13a and 13b serve as movable contacts that engage fixed contacts 16 and 17, respectively. Depending on the rotational positions of pulleys 11 and 12, either one of the electrically conductive sections 13a and 13b or non-conductive section 13c engages a sliding contact 18. The sliding contact is also movable and is selectively positioned along an electrically conductive element 18a.

Switching mechanism 10 is incorporated in a control circuit, such as schematically shown, that energizes a motor 19 and operates a pair of clutches 20 and 21, which selectively connect a tape supply reel 22 or a take-up reel 23 to motor 19. Pulley 12 of switching mechanism 10 connects to tape reel 23 through an analog computer mechanism 24 to maintain a linear relationship between the rate of tape movement and the rate at which belt 13 is moved by pulley 12. A preferred embodiment of such a device, illustrated in FIG. 2, is hereinafter described.

The control circuit for operating motor 19 and clutches 20 and 21 is designed to operate from an AC supply but provides a DC source for energizing a pair of solenoids 25 and 26 that operate clutches 20 and 21, respectively. The electrical circuit more particularly comprises an off-on switch 30, a momentary energizing switch 31 and a holding circuit including an SPST relay having a coil 32 which, when energized, closes normally open contacts 33.

Switching mechanism 10 operates in association with a DPDT relay having a coil 34 which, when energized, operates movable contacts 35 and 36 from points of normally closed contact 35a and 36a to points of normally open contact 35b and 36b. The position of the movable contacts 35 and 36 determines the connections made between a bridge rectifier, comprising diodes 37, 38, 39 and 40, and coils 25a and 26a of clutch operating solenoids 25 and 26. A dropping resistor 41 is employed in the connection between the bridge rectifier and solenoid coils.

Sliding contact 18 of switching mechanism 10 is mounted to an indicator 42 that may be positioned along a scale 43 having a plurality of markings 44. Each marking of the scale indicates a position that relates to a selected picture on a tape T extending between and wound around tape reels 22 and 23. Indicator 42 is accurately positioned relative to scale 43 by means of a fine hairline 45.

A typical example of operation follows:

Slide indicator 42 is positioned on scale 43 so that the hairline 45 is opposite the marking representative of a selected picture to be viewed. Movement of the indicator also causes contact 18 to slide along the electrically conductive element 18a, and if this position also places contact 18 into engagement with one of the electrically conductive sections 13a or 13b, it will condition the control circuit for energizing motor 19, and engage the appropriate clutch as will move nonconductive section 13c in the direction of contact 18. As an example, if indicator 42 is positioned to the right of that shown in FIG. 1, bringing contact 18 into engagement with the electrically conductive section 13b, and assuming on-off switch 30 is closed or "on," momentary closure of switch 31 will energize a circuit to solenoid coil 26a through switches 30–31, sliding contact 18, fixed contact 17, normally closed contacts 35a and 36a, and the bridge rectifier. In addition, a holding circuit is energized to relay coil 32, closing contacts 33. Motor 19 will then drive tape reel 23 through clutch 21, simultaneously rotating pulley 12 in a direction that moves the nonconductive section 13c toward sliding contact 18. When section 13c alone engages contact 18, the circuit energizing relay coil 32 is interrupted and contacts 33 open, deenergizing motor 19 as well as solenoid coil 26a.

Should sliding contact 18 be moved to the left and into a position that contact is made with electrically conductive section 13a, relay coil 34 is energized, reversing the movable contacts 35 and 36 and energizing solenoid coil 25a. It will be apparent that motor 19 is also energized, together with the holding circuit including coil 32. The energizing circuit for solenoid coil 25a extends from the AC power source through sliding contacts 18, electrically conductive section 13a, fixed contact 16, normally open but now closed contacts 35b and 36b, and the bridge rectifier.

FIG. 2 of the drawings illustrates a preferred analog computer mechanism 24 for driving switch belt 13 at a rate which bears linear relationship to the rate at which tape is wound upon and unwound from tape reels 22 and 23. The need for such a mechanism is apparent since each additional winding of tape increases the effective diameter of take-up so that the speed of tape travel increases or decreases depending on whether windings are being added or subtracted from the reels. In the past, this problem has been dealt with either by scaling the indicator to reflect the nonlinear relationship between reel displacement and tape movement or by frictionally contacting the film or tape and mechanically linking the indicator to the contact. A build up of cumulative errors attributable to slippage is customary although undesirable.

Mechanism 24 essentially comprises a pair of spiral pulleys 46 and 47, each having a continuous groove beginning at a large outer diameter and terminating at a smaller inner diameter. Both pulleys are mounted on a common shaft 48 that is mechanically linked as by gearing to tape reel 23. A cord 49, such as a radio dial cord, is fastened to the outer groove of one pulley, such as at point 46a, and to the inside groove of the other pulley, as at point 47a. Cord 49 is wound such that the diameter at the point of tangential contact of both pulleys is the same. Thus, as the cord is wound onto one pulley, it is wound off the other at the same linear rate per degree of revolution, and that portion of cord 49 which is unwound from the pulleys ("outside" the pulley system) remains a constant length. The cord outside the pulley system is entrained around a third pulley 50 that is mechanically linked with pulley 12 of the switching mechanism. For ease of assembly, cord 49 is made in two sections, each section being initially wound on respective pulleys, and the free ends joined by a tensioning spring, not shown.

In operation, pulleys 46 and 47 are rotated in direct angular relationship to the rotation of take-up reel 23, but in nonlinear relationship to the rate of tape movement. On the other hand, the spiral windings of cord 49 are wound and unwound in linear relationship to the movement of tape T. The transformation of angular displacement of pulleys 46 and 47 into movement of cord 49 as a linear function of film or tape travel is accomplished by selecting the radial pitch of the pulleys, the gear ratio from take-up reel to pulleys, and inside and outside pulley diameter in accordance with the following relationships:

$$K_r = K_l K_n \quad (1)$$

$$K_r = K_t K_n^2 \quad (2)$$

where $$K_l = \frac{\text{length of film or tape movement}}{\text{length of cord (or switch) movement}}$$

$$K_r = \frac{\text{take-up reel O.D.}}{\text{pulley O.D.}} = \frac{\text{take-up reel I.D.}}{\text{pulley I.D.}}$$

$$K_t = \frac{\text{thickness of film or tape}}{\text{radial pitch of pulley}}$$

$$K_n = \frac{\text{turns of take-up reel}}{\text{turns of pulley}}$$

A preferred embodiment of this invention operates switching mechanism 10 off of the tape reel which serves as the take-up reel in the viewing system rather than the supply reel. However, inasmuch as the take-up reel and supply reels are mechanically linked by the tape, it is also feasible to operate the switching mechanism from either one of the two reels. Nevertheless, it will be apparent that an important advantage is gained by operating the switching mechanism from the take-up reel. In so doing, the relationships required for linearizing the movement of the switching mechanism and making it directly proportional to tape movement remain the same even though the number of turns and amount of tape contained on various supply reels are different.

Although a preferred embodiment of this invention has been illustrated and described, various modifications and changes may be resorted to without departing from the spirit of the invention or the scope of the attached claims, and each of such modifications and changes is contemplated.

What is claimed is:

1. In a control circuit for operating a motor, a switching mechanism comprising: a pair of spaced, movable contacts, a slidable contact that may be preset in various positions along a predetermined path, means responsive to operation of said motor and controlled by said switching means for moving said pair of movable contacts along said predetermined path, and circuit means for energizing said motor when either one of said movable contacts engages said slidable contact and de-energizing said motor when neither movable contact engages said slidable contact, an engagement with one movable contact and said slidable contact causing said movable contacts to move in one direction along said predetermined path while an engagement with the other movable contact and slidable contact causes said movable contacts to move in the opposite direction.

2. In the control circuit of claim 1, said switching mechanism comprising a continuous belt having electrically conductive sections separated by a nonconductive section, a pair of wiping contacts engageable with said pair of electrically conductive sections, said motor control circuit being conditioned for energizing said motor when either of said electrically conductive sections engages said slidable contact.

3. The apparatus of claim 1 and further comprising a scale that extends along said predetermined path and an indicator mounted for movement along said scale, said sliding contact being connected to said indicator.

4. A film or tape positioning apparatus comprising: a pair of reels having a film or tape connected therebetween and adapted to be wound and unwound from said reels; a motor; means for selectively clutching said motor to one or the other of said reels; and a control circuit including a switching mechanism for energizing said motor and clutching said motor with one of said reels, said switching mechanism comprising a pair of movable contacts and a sliding contact that may be positioned in one of several positions along a predetermined path, means responsive to operation of said motor for simultaneously moving said movable contacts in the same direction as said predetermined path to bring said movable contacts into engagement with said slidable contact at various positions, said control circuit energizing said motor and clutching said motor with one of said reels when one of said movable contacts engages said slidable contact, an engagement between one of said movable contacts and said slidable contact clutching said motor with one reel while a contact between the other movable contact and said slidable contact clutches said motor with the other reel.

5. The apparatus of claim 3, said means for moving said movable contacts including an analog computer for moving said contacts at a rate linearly proportional to the rate of tape movement.

6. The apparatus of claim 4, said means for moving said movable contacts comprising a pair of substantially identical spiral pulleys mechanically connected to one of said reels, a cord wound around said spiral pulleys, one end of said cord being secured at the large diameter groove of one pulley and the other end being secured at the small diameter groove of the other pulley, said cord being wound around said pulleys such that the diameter at the point of tangential contact of both pulleys is substantially the same, said cord including a section between the pulleys that remains a constant length as the cord is wound onto one pulley and off the other pulley, and means engaged by said cord section for moving said movable contacts.

7. The apparatus of claim 6, one of said pair of reels being a supply reel and the other a take-up reel, said spiral pulleys being connected to the take-up reel, said spiral pulleys being constructed in accordance with the relationships $K_r = K_t K_n$ and $K_f = K_t K_n^2$, where $$K_r = \frac{\text{take-up reel O.D.}}{\text{pulley O.D.}} = \frac{\text{take-up reel I.D.}}{\text{pulley I.D.}}$$

and $$K_t = \frac{\text{thickness of film or tape}}{\text{radial pitch of pulley}}$$

and $$K_n = \frac{\text{turns of take-up reel}}{\text{turns of pulley}}$$

and $$K_l = \frac{\text{length of film or tape movement}}{\text{length of cord movement}}$$

* * * * *